Figure 1:
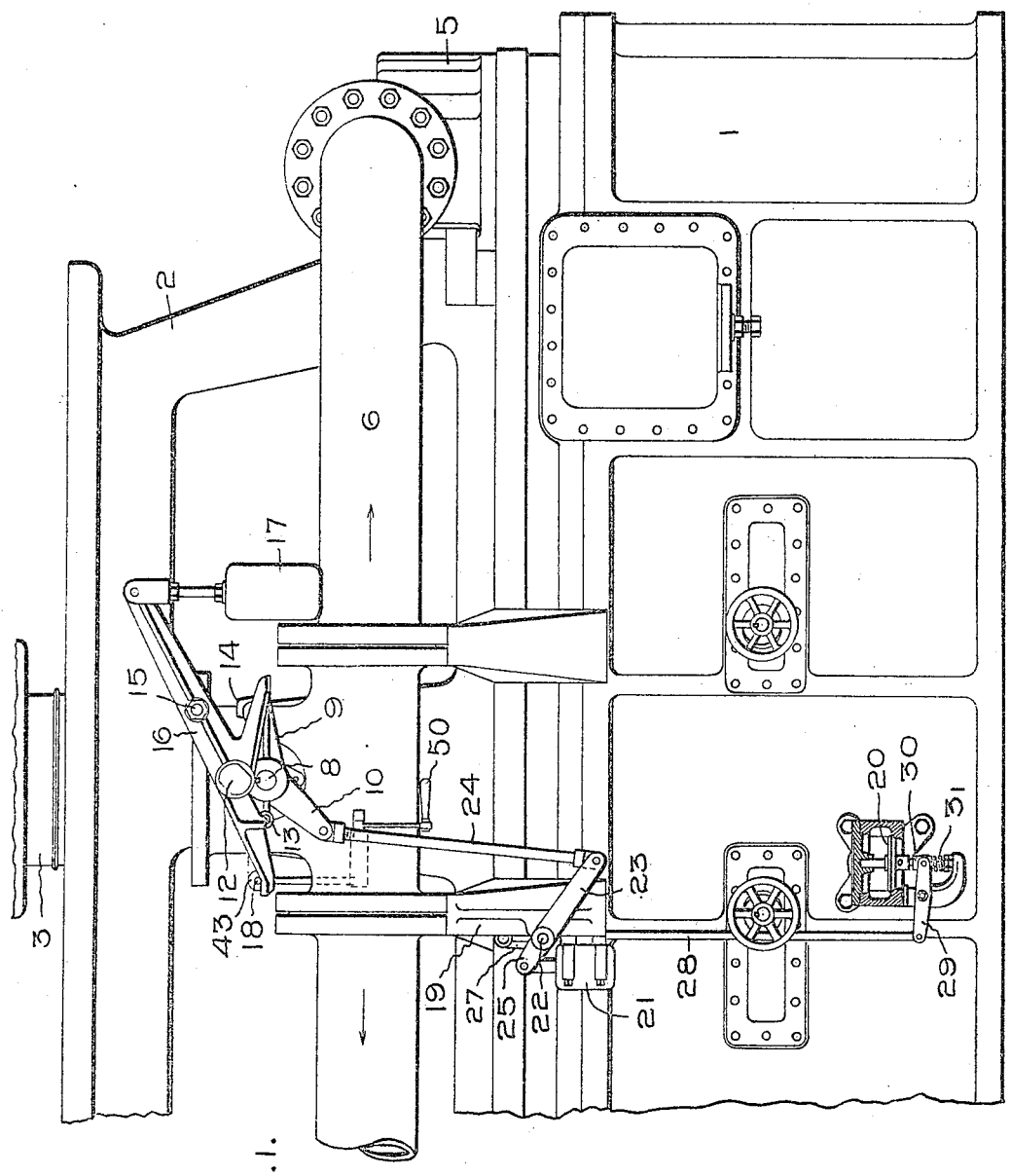

No. 801,230. PATENTED OCT. 10, 1905.
W. L. R. EMMET.
EMERGENCY AND VACUUM BREAKING VALVE MECHANISM.
APPLICATION FILED APR. 5, 1904.

2 SHEETS—SHEET 1.

Witnesses:
Marcus L. Byng.
Alex. F. Macdonald.

Inventor
William L. R. Emmet,
by Albert G. Davis
Att'y.

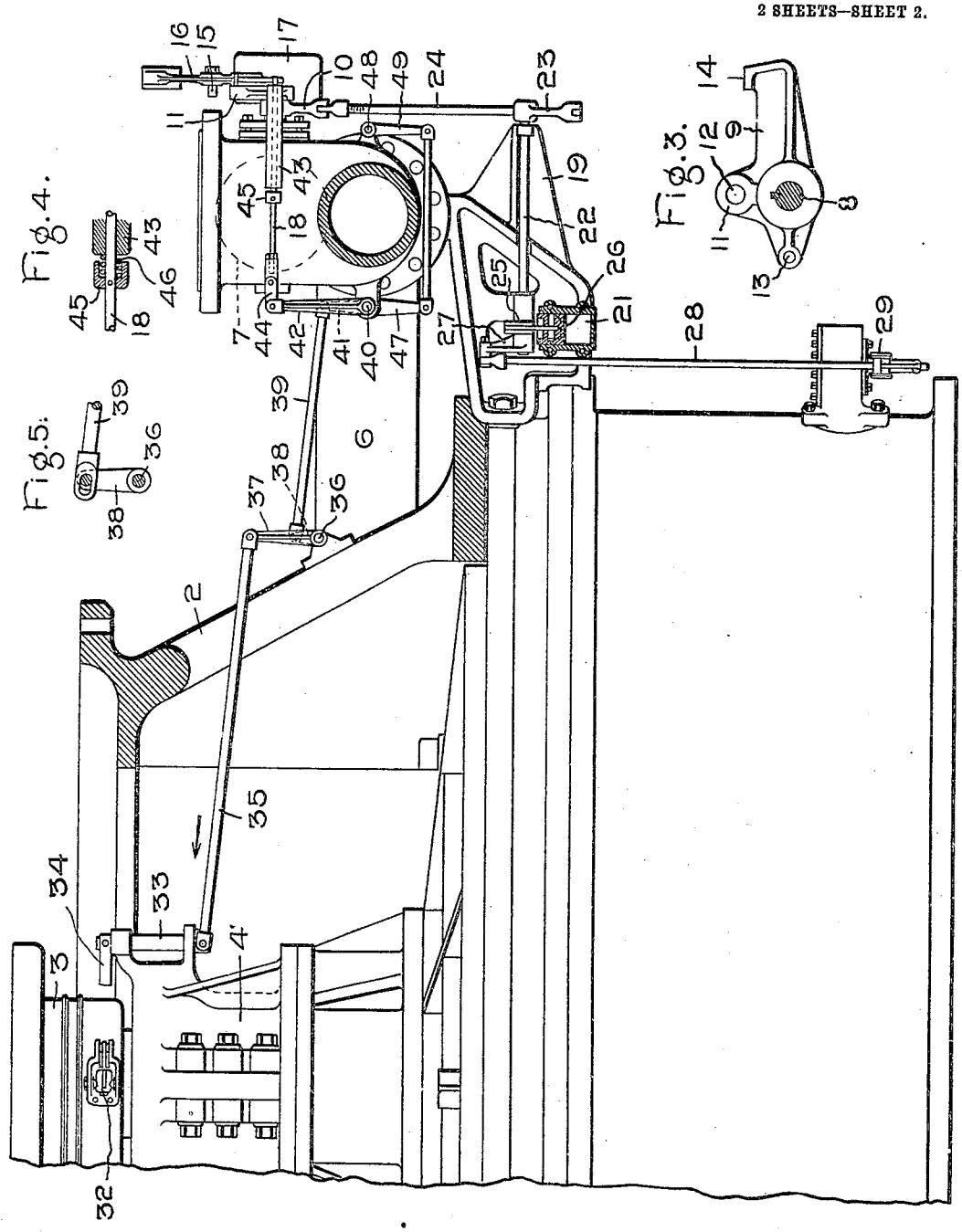

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

EMERGENCY AND VACUUM-BREAKING VALVE MECHANISM.

No. 801,230. Specification of Letters Patent. Patented Oct. 10, 1905.

Application filed April 5, 1904. Serial No. 201,748.

*To all whom it may concern:*

Be it known that I, WILLIAM L. R. EMMET, a citizen of the United States, residing at Schenectady, county of Schenectady, State of New York, have invented certain new and useful Improvements in Emergency and Vacuum-Breaking Valve Mechanism, of which the following is a specification.

When the load is suddenly taken off of a turbine—as, for example, by opening the circuit of a generator driven thereby—the main governor will normally cut off the supply of motive fluid. If the governor does not respond quickly enough or if it fails to operate from any cause, the emergency-governor will act and cut off the fluid-supply. Immediately the effect of the condenser will be felt, even in the first stage, and owing to the rarefied medium surrounding the wheels they will revolve for a long time. The length of time that they will revolve depends upon whether the field of the generator is on or off, it being greater when the field is off. Where reliance is placed upon forced lubrication for the bearings, the pump must be kept running as long as the wheel or wheels revolve, since otherwise the bearings would be ruined. In case an accumulator is employed it must continue to deliver lubricant to the bearings, which amounts to the same thing. It frequently happens that the wheel will run from one to two hours under such circumstances without being supplied with steam or other motive fluid. In this respect the problem of shutting down a turbine is unlike that of shutting down a reciprocating engine. When there is a small leakage through one or more nozzles or a nozzle-valve fails to close, the tendency for the wheel to continue its rotation is greatly increased, and the force exerted by the fluid may cause the wheel to race and perhaps to disrupt.

The present invention has for its object to provide a reliable and simple valve mechanism for turbines for cutting off the supply of motive fluid in times of emergency and at the same time breaking the effect of the vacuum by admitting air to the turbine-casing.

In carrying out my invention an emergency-valve—such, for example, as a butterfly-valve—is mounted in the inlet-pipe, and a weight or equivalent device is employed to operate it. I prefer to employ a gravity-actuated device, owing to its simplicity and reliability. The weight is carried by an arm that is attached to the valve-spindle, and the parts are so arranged that the weight moves a certain distance independently of the valve. The effect of this is to cause the weight or some part attached thereto to strike the valve-lever a hammer-blow and insure the prompt starting of the valve. Without some such device the valve might fail to close. Mounted for automatic operation is a vacuum-breaking valve which is designed to open and admit air to the condenser or turbine-casing, or both, at or about the time the emergency-valve closes. The valve may be actuated directly or indirectly by the weight. It is preferable to so arrange the parts that there is a certain amount of lost motion between the weight and the vacuum-valve-actuating mechanism, so that the weight will impart a hammer-blow. The object of this is to insure the prompt starting of the valve.

In order to prevent excessive shocks to the apparatus, which might result if the weight and attached parts were brought to an abrupt stop, a dash-pot is provided which comes into service after the weight has imparted its blow to the valve-actuating mechanism. The parts of the dash-pot may be stationary until after the weight delivers its blow, which is the preferred arrangement, or they may move relatively from the start, in which case the checking action should not take place until the weight has delivered its blow, and thus started the parts from a position of rest.

The vacuum-breaking valve opens inwardly to permit air to enter the condenser system, and under normal conditions it is weighted, as by a spring, to hold it in the closed position and opposing atmospheric pressure.

The weight-carrying arm is normally held in position for operation by a latch that is under the control of a speed-responsive device, the latter being set to operate at a predetermined excess in speed—say ten per cent., for example. The emergency device is preferably arranged to reset itself upon a predetermined decrease in speed—say twenty-five per cent., for example. Attached to the latch is a resetting-handle that is located on the front side of the steam or other fluid carrying conduit that supplies motive fluid to the turbine. By reason of this construction the weight can be raised with one hand and the latch set by the other, the emergency speed-responsive device resetting itself automatically. Setting the emergency-valve also closes the vacuum-breaking valve.

It is evident that a considerable effort will be required to start the valve-operating mechanism from a position of rest into motion, and it is preferable, although not absolutely necessary, to so arrange the parts that certain of the levers and rods start into operation before the remainder. In other words, a certain amount of lost motion is provided, so that one portion is started into operation before the other, and the portion which first starts into operation delivers a blow to the succeeding portion or portions. A simple way to accomplish this is to slot one of the connecting-rods and to include a spring between a fixed abutment on the rod and a stationary part which normally keeps the connecting-pin in one end of the slot.

In the accompanying drawings, which illustrate one embodiment of my invention, Figure 1 is a partial front elevation of a vertical turbine of the four-stage jet type. Fig. 2 is a view taken at right angles to that of Fig. 1 with certain of the parts broken away. Fig. 3 is a detail view of the lever employed to actuate the emergency-valve and support the weight-arm. Fig. 4 is a detail view showing the take-up spring in the connection between the emergency device and the weight-releasing latch, and Fig. 5 is a detail view showing a lost-motion connection between the emergency-weight and the tripping-latch.

1 represents the casing of the turbine, which surrounds the bucket-wheels and nozzles or other devices for discharging motive fluid against the buckets. The turbine may be of any suitable construction, although the one illustrated is of the four-stage Curtis type. The casing may be directly connected to a condenser, or the condenser may be built directly in the base. In either case a vacuum exists in one or more of the wheel-chambers.

Mounted on top of the turbine-casing is a stool 2, which supports the casing of a dynamo-electric machine. (Not shown.) 3 represents the vertical shaft to which the bucket-wheels and the movable element of the generator are attached. Surrounding the shaft and mounted on top of the casing is a guide-bearing 4 of any suitable construction. Surrounding the stool and arranged to supply steam or other elastic fluid to the steam-chests 5, containing a plurality of separately-actuated valves, is a conduit 6. The valves may be actuated directly or through relay devices. The conduit is provided at a point between the steam-chests with an emergency-valve 7. (Shown in dotted lines, Fig. 2.) When open with the parts arranged as shown, the valve stands in a vertical or substantially vertical position. The valve is provided with a spindle 8, to which is attached a lever 9 (best shown in Fig. 3) and an arm 10, that is connected to the vacuum-breaking valve. The lever 9 is provided with an extension 11, Fig. 3, which receives the pivot 12 of the weight-carrying arm. It is also provided with an extension which carries a pin 13, the latter being arranged to engage with the weighted arm and act as a stop for holding the valve in the open position. The lever 9 and the emergency-valve 7 occupy planes at right angles or substantially right angles to each other. The right-hand end of the lever 9 is provided with a projection 14, that is adapted to be struck by the pin 15 on the weight-arm when the latter is tripped. Between the pin and the projection 14 is a certain amount of space which constitutes a lost-motion connection between the weight-arm and the valve. It is to be noted that the weight-arm 16 is pivoted at a point eccentric with respect to the valve-spindle, the object of this being to increase the leverage of the weight when the latter is tripped and the valve is closed. If the weight-arm and lever had the same center, the weight would merely hang in line with the valve when the latter is closed. To the right-hand end of the weight-arm is attached a weight 17, the left-hand end being arranged to engage the latch 18. On the under side of the weight-arm is a projection which engages with the stop-pin 13 on the valve-actuating lever.

Attached to the front of the wheel-casing is a bracket 19, which assists in supporting the conduit 6 and also carries the mechanism for operating the vacuum-breaking valve 20. To the bracket is secured a dash-pot cylinder 21 for preventing undue shocks when the valve mechanism operates. Mounted in the bracket and extending in a horizontal direction is a rock-shaft 22, which is provided with suitable bearings. To the outer end of the rock-shaft is attached an arm 23, which is connected to the arm 10 of the emergency-valve by a rod 24, the latter being screw-threaded at its ends for the purpose of adjustment. On the inner end of the rock-shaft is an arm 25, which is attached to the piston 26 of the dash-pot. On the inner end of the rock-shaft is also an arm 27, which is attached to the vertically-extending rod 28, and to the lower end of this rod is attached a lever 29, Fig. 1, for opening the vacuum-breaking valve. The lever 29 is pivoted to an extension on the valve-casing and engages at its right-hand end with a loose collar 30, that is mounted on the valve-stem. Between the upper surface of the collar and a hub on the valve is a certain amount of lost motion, which is taken up before the valve opens. The lost motion is somewhat exaggerated for the purpose of illustration. Situated below the collar is a spring 31, that tends at all times to hold the valve 20 against its seat. The tension of this spring is such that it will hold the valve close against atmospheric pressure when the turbine is in operation and the condenser is creating a vacuum in one or more of the wheel-compartments.

In order to actuate the emergency-valve and the vacuum-breaking valve under predetermined conditions of excess speed, a centrifugally-acting weight 32 is mounted in a suitable support on the shaft 3. This weight is normally set to move outwardly under conditions of excess speed and to reset itself when the speed has decreased a certain per cent. below the normal running speed.

Mounted in a bracket attached to the valve-casing or other support is a rock-shaft 33, Fig. 2, having at its upper end a curved arm 34, which is adapted to be struck by the emergency governing-weight 32 when the conditions are such that it becomes necessary to operate the valve mechanism. On the lower end of the rock-shaft and extending toward the observer is an arm to which the rod 35 is attached. When the emergency-weight operates, it moves the rod in the direction indicated by the arrow. Mounted in a suitable bracket attached to the stool 2 is a rock-shaft 36, carrying arms 37 and 38 of different lengths to obtain the proper movements. The former is attached at its outer end to the rod 35 and the latter to a rod 39. Mounted in suitable bearings on the side of the emergency-valve casing adjacent to the turbine is a rock-shaft 40, to which are attached two arms 41 and 42. The former (shown in dotted lines) is connected to the outer end of the rod 39 and the latter to the latch 18, which normally locks or holds the weight-arm 16 in the position shown in the figures. The inner or left-hand end of the rod 39 is slotted to receive the pin carried by the arm 38, as shown in Fig. 5. When the emergency-weight on the shaft strikes, the arm 34 first takes up the lost motion in the slot and thereafter pulls the rod and releases the latch. The spring 46, Fig. 4, to be hereinafter referred to, normally holds the parts in the position shown. The latch 18 comprises a rod which is guided near its outer end by a boss 43, formed on the valve-casing, and a link 44, one portion of which is connected to the arm 42, while the other is connected to an end of the rod and is provided with a take-up device. Between the boss 43 and a collar 45 on the rod is the spring 46, Fig. 4, which presses the latch in the direction of the arrow and serves to take up the lost motion between the slot or loop in rod 39 and the pin carried by the arm 38.

In order to reset the latch, an arm 47 is provided that is attached to the rock-shaft 40 and extends downwardly therefrom. On the front of the valve-casing is a projection containing a pivot 48, which supports an arm 49, and the latter is connected to the arm 47 by a horizontal connecting-rod. On the lower end of the arm 49 is a handle 50, Fig. 1, by means of which the latch can be operated manually from the front side of the emergency-valve. By means of this handle it is possible to reset the latch or to trip the emergency-valve by hand whenever it is desired.

Assuming that the speed of the turbine becomes abnormal, the weight 32 moving outwardly strikes the arm 34, which moves the rod 35 in the direction of the arrow. This in turn causes the latch 18 to be withdrawn from engagement with the weight-lever 16, and the weight 17 immediately starts into motion. The emergency-valve remains stationary until the pin 15 on the weight-arm engages the projection 14 on the valve-lever. In other words, the weight in falling hits the valve-lever a blow, which causes it to start the valve into operation. Continued movement of the weight moves the valve through an angle of about ninety degrees, causing it to prevent the further admission of motive fluid. At or about the instant the valve starts into operation the arm 10 and connecting rods and levers start the vacuum-breaking mechanism into operation. The movements of the valves are cushioned by the dash-pot 21, which, it will be seen, is common to both the emergency-valve and the vacuum-breaking valve. When the vacuum-breaking valve is raised, the rush of air into the casing tends to hold it open. This is in addition to the upward force exerted by the lever 29 and attached parts.

In order to reset the parts, the weight 17 and weight-lever are raised to the position shown in Fig. 1, and the handle 50 is moved to cause the latch 18 to engage the left-hand end of the weight-arm, after which the valve-lever 9 is rotated until the stop-pin 13 engages the projection on the weight-arm. This movement also relieves the pressure on the vacuum-breaking valve and permits the latter to close under the action of the spring 31.

In accordance with the provisions of the patent statutes I have described the principle of operation of my invention, together with the apparatus which I now consider to represent the best embodiment thereof; but I desire it to be understood that the apparatus shown is only illustrative and that the invention can be carried out by other means.

What I claim as new, and desire to secure by Letters Patent of the United States, is—

1. In an elastic-fluid turbine, the combination of an emergency-valve, a vacuum-breaking valve, and a means for starting both valves into operation by a hammer-blow.

2. In an elastic-fluid turbine, the combination of an emergency-valve, a vacuum-breaking valve, a means for starting both valves into operation by a hammer-blow, and a dash-pot which is common to both valves.

3. In an elastic-fluid turbine, the combination of valves, a dash-pot which is common to the valves, and a means for operating the valves through a lost-motion connection.

4. In an elastic-fluid turbine, the combination of individual valves, a means for operating the valves which starts them with a hammer-blow, and a dash-pot which cushions one of the valves after the blow has been delivered.

5. In an elastic-fluid turbine, the combination of an emergency-valve, a vacuum-breaking valve, an operating connection between the valves, a dash-pot which is included in the connection, and a single means for operating both valves.

6. In an elastic-fluid turbine, the combination of an emergency-valve, a vacuum-breaking valve, an operating connection between the valves, a bracket for supporting the connection, a dash-pot which is included in the connection and is carried by the bracket, and means for actuating the valves.

7. In an elastic-fluid turbine, the combination of an emergency-valve, a vacuum-breaking valve, an emergency-governor mounted on the turbine-shaft, and a means for operating the valves which is set in motion by the governor.

8. In an elastic-fluid turbine, the combination of an emergency-valve, a vacuum-breaking valve, an emergency-governor mounted on the turbine-shaft, a weight for operating the valves which is set in motion by the governor, and a dash-pot that is common to both valves.

9. In an elastic-fluid turbine, the combination of an emergency-valve, a vacuum-breaking valve, an emergency-governor on the turbine-shaft, and a means operated by the governor and including a lost motion for releasing the valve-actuating device.

10. In an elastic-fluid turbine, the combination of an emergency-valve, a vacuum-breaking valve, an emergency-governor on the turbine-shaft, a weight for closing the emergency-valve, and opening the vacuum-breaking valve which starts the valves into operation by a hammer-blow, and a means including a lost-motion connection for releasing the weight.

11. In an elastic-fluid turbine, the combination of an emergency-governor mounted on the shaft, an emergency-valve mounted near the periphery of the casing, a vacuum-breaking valve attached to the turbine-casing, a means common to the valves for operating them, a connection between the emergency-governor and the means for starting the latter into operation, and a manually-actuated resetting device situated near the emergency-valve.

12. In an elastic-fluid turbine, the combination of an emergency-valve, a lever mounted on the valve-spindle for operating it, an arm pivotally supported by the lever, a means for normally holding the arm in a given position, a vacuum-breaking valve, and a connection between the lever and the vacuum-breaking valve for operating the latter.

13. In an elastic-fluid turbine, the combination of an emergency-valve, a lever mounted on the valve-spindle for operating it, an arm pivotally supported by the lever, a means normally holding the arm in a given position, a vacuum-breaking valve, a connection between the lever and the vacuum-breaking valve for operating the latter, and a dash-pot for cushioning the movements of the valves.

14. In an elastic-fluid turbine, the combination of individual valves, a lever attached to one of the valves for actuating it, an operating connection between the lever and another valve, and an arm for actuating the lever which also acts as a stop for a valve.

15. In an elastic-fluid turbine, the combination of a valve, a lever attached thereto for actuating it, and an arm loosely attached to the lever for moving it under certain conditions and acting as a stop for the valve under other conditions.

16. In an elastic-fluid turbine, the combination of individual valves, a lever attached to one of the valves for actuating them all, an arm loosely mounted on the lever, and means for transmitting motion from the arm to the lever after it has taken up a certain amount of lost motion.

17. In an elastic-fluid turbine, the combination of a butterfly-valve, a vacuum-breaking valve, a connection between the valves for rocking the butterfly-valve and moving the vacuum-breaking valve longitudinally, and a single means for operating both valves.

18. In a turbine, the combination of an emergency-valve, a vacuum-breaking valve, an arm on the spindle of the emergency-valve, a lever and links connecting the arm with the vacuum-breaking valve, and a governor-controlled means for actuating the emergency-valve.

19. In a turbine, the combination of an emergency-valve, a vacuum-breaking valve, an arm on the spindle of the emergency-valve, a lever and links connecting the arm with the vacuum-breaking valve, a governor-controlled means for actuating the emergency-valve, and a dash-pot which cushions the movements of the valves.

20. In an elastic-fluid turbine, the combination of individual valves, and a weighted arm for actuating the valves, which is connected thereto by a lost-motion connection.

21. In an elastic-fluid turbine, the combination of a valve, a means for operating the valve which delivers a hammer-blow, and a dash-pot for cushioning the movement of the valve which becomes effective after the means has delivered its blow and the valve has opened a certain distance.

In witness whereof I have hereunto set my hand this 4th day of April, 1904.

WILLIAM L. R. EMMET.

Witnesses:
BENJAMIN B. HULL,
HELEN ORFORD.